United States Patent
Gnage et al.

(10) Patent No.: US 6,589,380 B2
(45) Date of Patent: Jul. 8, 2003

(54) LASER WELDED AIR CONTROL VALVE AND METHOD

(75) Inventors: Douglas Ronald Gnage, Hilton, NY (US); Gary John DeAngelis, Spencerport, NY (US); David M. Peers, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 107 days.

(21) Appl. No.: 09/778,389

(22) Filed: Feb. 7, 2001

(65) Prior Publication Data

US 2002/0104981 A1 Aug. 8, 2002

(51) Int. Cl.[7] .................. B32B 31/00; B23K 17/00; F16K 1/22
(52) U.S. Cl. .................. 156/272.8; 29/890.12; 29/890.124; 251/305; 251/307; 251/308
(58) Field of Search ............... 251/305, 307, 251/308; 156/272.8; 123/188.14; 29/890.12, 890.124

(56) References Cited

U.S. PATENT DOCUMENTS

| | | | | | |
|---|---|---|---|---|---|
| 3,666,235 A | * | 5/1972 | Scott | ............ | 251/118 |
| 3,769,117 A | * | 10/1973 | Bowen | ............ | 156/69 |
| 4,047,696 A | * | 9/1977 | Ludwig | ............ | 251/308 |
| 4,133,512 A | * | 1/1979 | Johnson | ............ | 251/173 |
| 4,636,609 A | * | 1/1987 | Nakamata | ............ | 219/121.64 |
| 5,125,624 A | * | 6/1992 | Yohner | ............ | 251/305 |
| 5,343,014 A | * | 8/1994 | Ogino | ............ | 219/121.64 |
| 5,666,988 A | * | 9/1997 | Becker | ............ | 137/15.18 |
| 5,902,426 A | * | 5/1999 | Daly | ............ | 156/242 |

FOREIGN PATENT DOCUMENTS

GB    2087516    * 5/1982

* cited by examiner

*Primary Examiner*—Michael W. Ball
*Assistant Examiner*—Justin Fischer
(74) *Attorney, Agent, or Firm*—Patrick M. Griffin

(57) ABSTRACT

An engine air control valve assembly includes a valve shaft and a valve plate made from composite polymeric plastics that are formed to be welded together by infrared laser welding. In a preferred embodiment, the valve shaft includes an intermediate portion with a longitudinal open groove along one side. The valve plate is formed with a central raised portion that engages the valve shaft in assembly. A tongue extends inward from the raised portion of the plate and is fitted into the shaft groove after assembly of the shaft into a valve body. The tongue is softened by a laser beam applied to the tongue/groove interface, thereby welding the valve components together in the installed location.

2 Claims, 2 Drawing Sheets

LASER WELDED AIR CONTROL VALVE AND METHOD

TECHNICAL FIELD

This invention relates to air control valves and valve assemblies for controlling air flow through a passage. An exemplary application is as a throttle or air control valve in an engine induction system.

BACKGROUND OF THE INVENTION

It is known in the art to provide air valves, such as intake throttle valves and port deactivation valves for use in internal combustion engines. Such valves may be located in a valve body, a manifold runner connected to an engine intake port or another tubular air passage defining body. The valve may be formed as a flat plate secured against a flattened portion of a valve shaft and held in place by lock screws.

Assembly of the valve in the valve body may be accomplished, without making a jointed valve body. The shaft is first inserted into the valve body through bearings provided along the valve axis. The valve plate is then installed through an open end of the air passage and secured to the shaft in place by tightening the lock screws through the open passage end. The assembly process is simple but labor intensive and may be difficult in some applications, such as in port deactivation valves where the location of the valves in the manifold runners may make the assembly point difficult to reach. While alternative valve arrangements have been proposed, the valve structure and assembly method described above have been applied to metal throttle valves for engines over many years.

SUMMARY OF THE INVENTION

The present invention provides an alternative engine air control valve and assembly method for use in various applications. It is particularly suited for an air control valve in a plastic throttle body or intake manifold body. The valve shaft and valve plate are made from composite polymeric plastics that are formed to be welded together by localized melting and hardening processes such as by infrared laser welding.

In a preferred embodiment, the valve shaft includes an intermediate portion with a longitudinal open groove along one side. The valve plate is formed with central raised portion that engages the valve shaft in assembly. A tongue extends inward from the raised portion of the plate and is fitted into the shaft groove after assembly of the shaft into a valve body. The tongue is softened by a laser beam applied to the tongue/groove interface, welding the valve components together in the installed location.

These and other features and advantages of the invention will be more fully understood from the following description of certain specific embodiments of the invention taken together with the accompanying drawings.

DESCRIPTION OF THE PREFERRED EMBODIMENT

Figure 4:
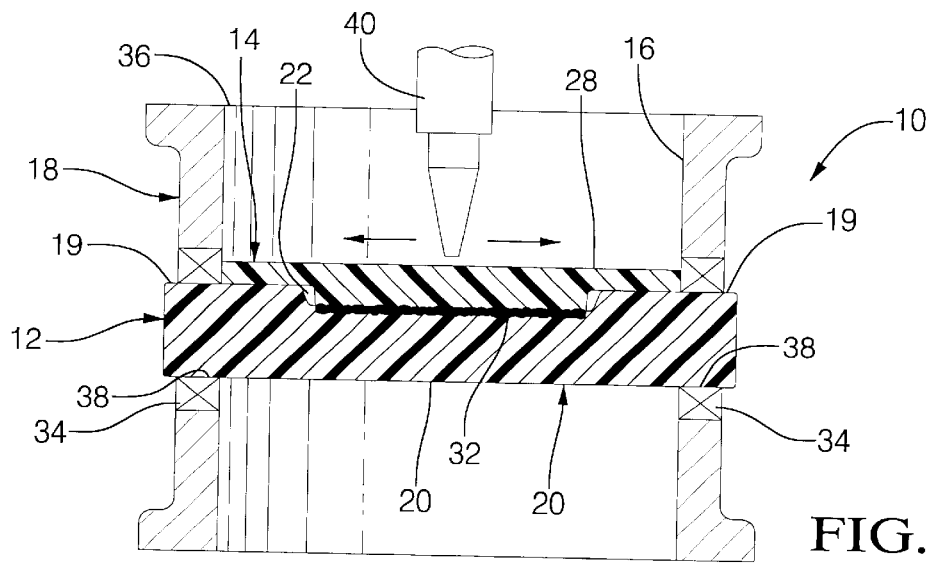
FIGS. 4 and 5 are cross-sectional views showing laser welding of the valve plate to the shaft in place in a valve body.
Figure 5:
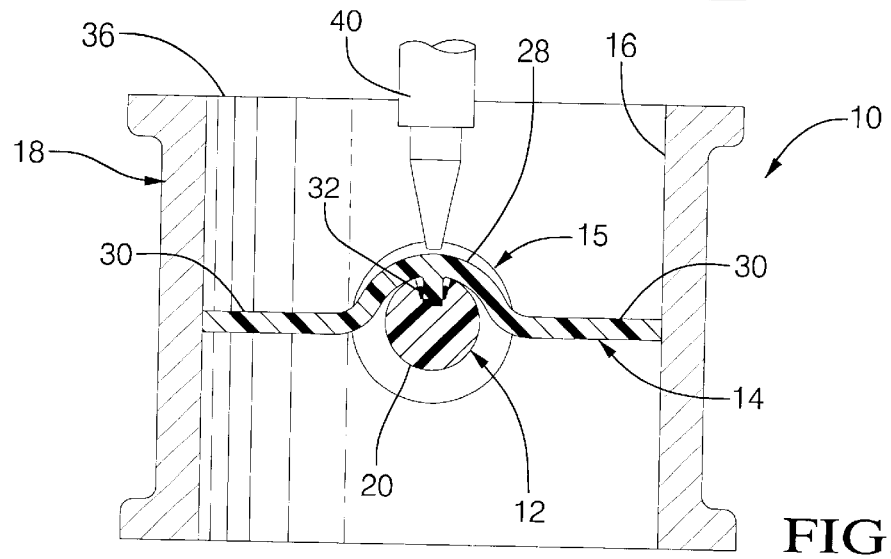
Figure 6:
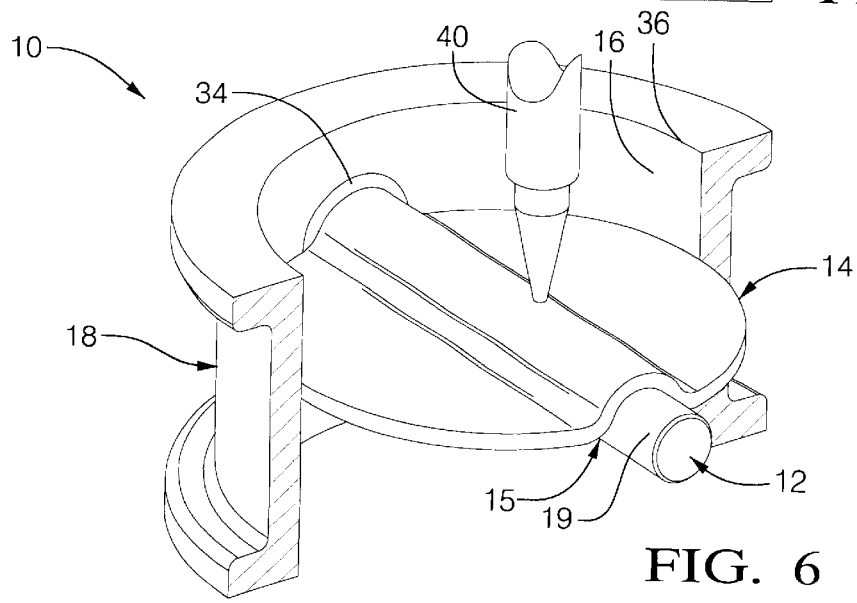
FIG. 6 is a pictorial view with the valve body sectioned to show the appearance of the air valve in the completed assembly after welding.

Referring first to FIGS. 4–6 of the drawings in detail, numeral 10 generally indicates an air valve assembly for controlling air flow through a tubular passage. Assembly 10 includes a valve shaft 12 and a valve plate 14 welded together to form an air control valve 15 mounted for rotational motion in a passage 16 of a valve body 18 for controlling air flow through the passage 16. Both the shaft 12 and the plate 14 are made of composite polymeric plastic materials. The passage 16 and the associated valve plate 14 are shown as of circular cylindrical configuration; however, other configurations such as oval or rectangular could be used if desired. The valve body 18 may be made of metal or plastic although a plastic material may be preferred.

The valve shaft 12 is formed as a straight cylindrical member although other configurations for the shaft could be used if desired. The shaft includes opposite ends 19 connected by an intermediate portion 20. The ends 19 are preferably cylindrical for mounting in bearing surfaces. The intermediate portion 20 includes a longitudinally extending open groove 22 having a bottom 24 and sloped sides 26. One end of the shaft could be extended or otherwise provided with means, not shown, for connection of the shaft with a conventional actuating device or mechanism.

Figure 2:
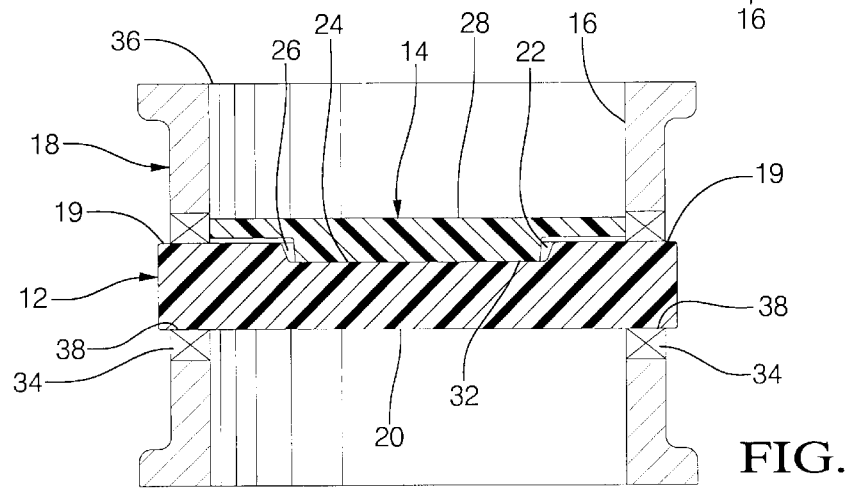
FIG. 2 is a cross-sectional view similar to FIG. 1 showing the valve assembly components in a valve body in position for laser welding.
Figure 3:
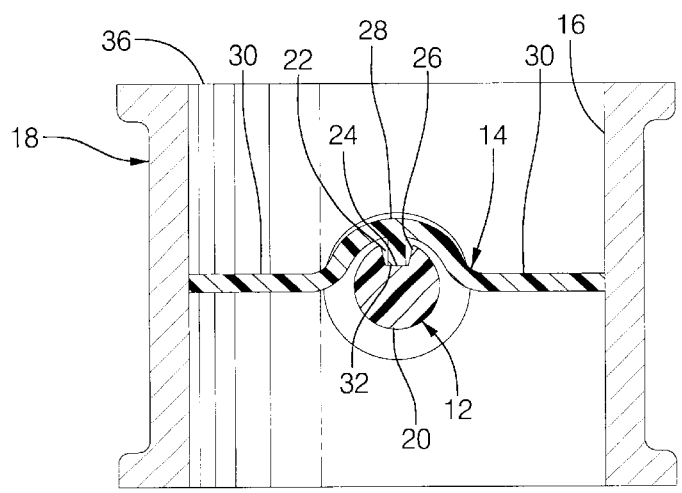
FIG. 3 is a cross-sectional view similar to FIG. 2 but taken transverse to the throttle shaft axis.

The valve plate 14 includes a raised central portion 28 with lateral control portions 30 extending oppositely from the central portion. A depending tongue 32 extends radially inward from the central portion and longitudinally across a center part of the raised central portion. Preferably, the tongue 32 is made initially slightly deeper than the shaft groove 22 into which the tongue initially extends, as is shown in FIGS. 2 and 3.

Assembly of the valve 15 into the valve body 18 to form the valve assembly 10 is shown in FIGS. 1–5. The valve body may be of generally tubular form and defines internally the air flow passage 16, which may be cylindrical as shown but could have other linear configurations, as in an intake manifold runner. Bearings 34 are provided in the body 18 on opposite sides of the passage 16 and preferably near an open end 36 of the passage 16, at least one of the bearings 34 including a through hole 38.

Figure 1:
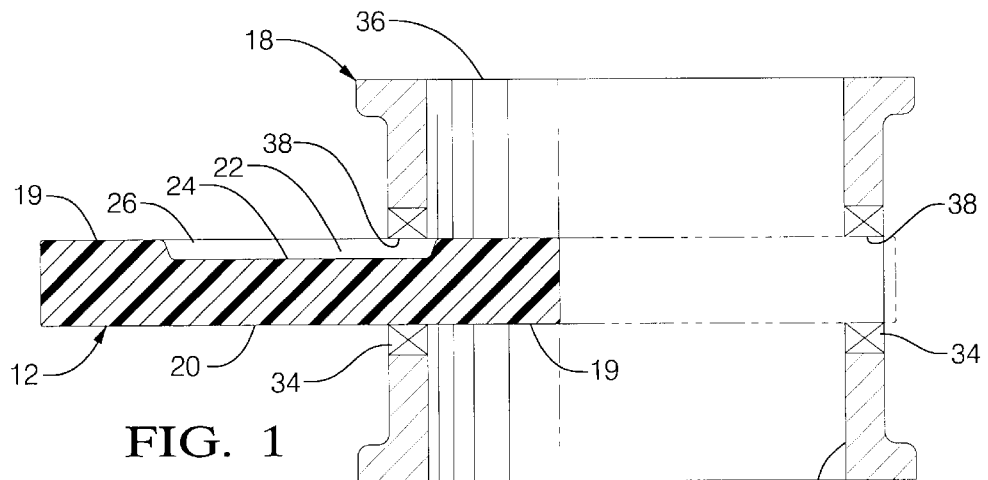
FIG. 1 is a cross-sectional view showing a step in forming an air valve assembly according to the invention, the view taken along the axis of the throttle shaft.

In assembly, the valve body 18 may be oriented with the passage open end 36 facing upward. The valve shaft 12 is then inserted through the bearing hole 38 into passage 16 as shown in FIG. 1. The shaft ends 19 are disposed in engagement with the bearings 34 and the groove 22 in the shaft is positioned to face upward as shown in FIGS. 2 and 3. The valve plate 14 is then inserted into the passage 16 through the open end 36 and placed on the valve shaft 12 with the tongue 32 inserted into the groove 22. Since the tongue is deeper than the groove, the raised portion 28 of the valve plate is held slightly above the shaft 12 at this time, as FIGS. 2 and 3 illustrate.

For welding of the valve plate 14 to the shaft 12, the valve plate with its tongue 32 is made of plastic which is essentially transparent to an infrared laser beam. As is shown in FIGS. 4 and 5, the valve plate 14 is welded to the shaft by directing a beam from a laser 40 into the open end 36 of the passage 16. the laser beam passes through the laser transparent material of the valve plate 14 and tongue 32 to the bottom 24 of the groove 22 which is formed with a laser energy absorbing "black" material. The laser energy heats the bottom 24 of the groove and the lower end of the tongue 32, causing the tongue lower end to melt as the valve plate 14 is urged downward. The melting plastic material is displaced upward beside the tongue 32 into spaces formed by the sloped sides 26 of the groove 22 and the valve plate 14 is lowered or forced down until the plate raised portion 28 engages the valve shaft 12 as seen in FIGS. 4 and 5. The plastic hardens after the laser heating cycle is complete and the valve plate 14 is then solidly welded to the shaft 12 within the valve assembly 10.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of assembling an air control valve assembly, the method including:

assembling a valve shaft into a passage defining valve body by disposing end portions of the shaft into shaft supports in the body with an intermediate portion of the shaft extending laterally across the body;

inserting a valve plate into the passage and positioning in engagement mating parts of the plate and the intermediate portion of the valve shaft, the mating parts including a tongue extending from the valve plate into an open groove of the shaft and arranged for absorbing laser energy at the bottom of the groove; and laser welding the engaged portions of the plate and shaft together within the passage by projecting a laser beam against the engaged portions through an open end of the valve body;

wherein the laser beam is directed through a portion of the valve plate that is essentially transparent to the laser beam and the mating parts of the valve shaft absorb the laser energy and in turn melt the mating parts of the valve plate to complete the weld.

2. A method as in claim 1 wherein the tongue is made deeper than the groove so that melted material from the tongue is displaced upward between the tongue and groove to form a strong welded connection.

* * * * *